(12) United States Patent
Kawakami et al.

(10) Patent No.: US 7,759,425 B2
(45) Date of Patent: Jul. 20, 2010

(54) CURABLE COMPOSITION

(75) Inventors: Atsushi Kawakami, Pasadena, TX (US); Seigo Nakamura, Westerlo-Oevel (BE)

(73) Assignees: Kaneka Corporation, Osaka (JP); Kaneka Texas Corporation, Pasadena, TX (US)

( * ) Notice: Subject to any disclaimer, the term of this patent is extended or adjusted under 35 U.S.C. 154(b) by 408 days.

(21) Appl. No.: 11/806,346

(22) Filed: May 31, 2007

(65) Prior Publication Data

US 2007/0282080 A1    Dec. 6, 2007

Related U.S. Application Data

(60) Provisional application No. 60/810,134, filed on Jun. 2, 2006.

(51) Int. Cl.
 *C08L 27/04* (2006.01)
 *C08L 83/16* (2006.01)
(52) U.S. Cl. .................. 525/100; 525/104; 525/106
(58) Field of Classification Search .................. None
 See application file for complete search history.

(56) References Cited

U.S. PATENT DOCUMENTS

| 4,562,237 | A | 12/1985 | Okuno et al. |
| 4,657,986 | A | 4/1987 | Isayama et al. |
| 5,109,064 | A | 4/1992 | Wakabayashi et al. |
| 5,840,783 | A * | 11/1998 | Momchilovich et al. .... 522/112 |
| 2003/0096904 | A1* | 5/2003 | Hakuta et al. ................ 524/588 |
| 2004/0138356 | A1* | 7/2004 | Miyata et al. ................ 524/262 |
| 2005/0165169 | A1* | 7/2005 | Levey et al. ................. 525/192 |

FOREIGN PATENT DOCUMENTS

| EP | 1 471 113 A1 | | 10/2004 |
| JP | 54-6097 | * | 1/1979 |
| JP | 57-182350 A | | 11/1982 |
| JP | 59-24771 A | | 2/1984 |
| JP | 61-268720 A | | 11/1986 |
| JP | 63-112642 A | | 5/1988 |
| JP | 63-118364 | * | 5/1988 |
| JP | 2004-323843 A | | 11/2004 |

* cited by examiner

*Primary Examiner*—Marc S Zimmer
(74) *Attorney, Agent, or Firm*—Sughrue Mion, PLLC

(57) ABSTRACT

An object of the invention is to provide a curable composition wherein the adhesiveness to thermoplastic polyolefin (TPO) is improved. The invention is a curable composition containing (A) a polyoxyalkylene polymer having reactive silicon group(s), (B) a polyolefin polymer, and (C) a tackifying resin.

14 Claims, No Drawings

CURABLE COMPOSITION

BACKGROUND OF THE INVENTION (1) Field of the Invention

The present invention relates to a curable composition which comprises a reactive silicon group-containing polyoxyalkylene polymer, a polyolefin polymer, and a tackifying resin. The invention also relates to an adhesive for waterproof sheets and an industrial adhesive wherein the curable composition is used. The invention relates in particular to a curable composition having an excellent adhesiveness to an adhesion-resistant substrate such as Thermoplastic Polyolefin (hereinafter referred to as TPO) and the use thereof.

(2) Description of the Related Art

It is known that organic polymers each having reactive silicon group(s) in the molecule turn to a rubbery cured product by a matter that the reactive silicon group hydrolyzed by moisture forms a siloxane bond.

Out of such organic polymers having reactive silicon group(s), polymers wherein the main chain thereof is a polyoxyalkylene have already been produced industrially. The polymers are widely used for sealing compounds, adhesives, injections or impregnates, pate materials, paints, and other articles.

These articles are required to have adhesiveness to various materials; thus, in order to give adhesiveness thereto, an adhesion-imparting agent such as a silane coupling agent or a titanium coupling agent is added thereto, thereby improving the adhesiveness (for example, Japanese Laid-Open Patent Application No. 57-182350 and Japanese Laid-Open Patent Application No. 59-024771). Furthermore, an epoxy resin is added thereto, thereby improving the adhesiveness (for example, Japanese Laid-Open Patent Application No. 61-268720), or an acrylic resin compatible therewith is added thereto, thereby improving the adhesiveness (for example, Japanese Laid-Open Patent Application No. 63-112642).

In recent years, investigations have been made for improving the adhesiveness to an adhesion-resistant substrate, such as EPDM (ethylene-propylene-diene based rubber), by the addition of a thermoplastic elastomer to a reactive silicon group-containing organic polymers (for example, Japanese Laid-Open Patent Application No. 2004-323843).

However, a material has not yet been obtained which has a sufficient adhesiveness to a thermoplastic polyolefin (TPO) substrate, which is one adhesion-resistant substrate used in fields of waterproof sheets for roofs, automobiles, and others.

SUMMARY OF THE INVENTION

An objective of the present invention is to provide a curable composition having an excellent adhesiveness to adhesion-resistant substrates, which are not caused to adhere with ease according to conventional bonding techniques, in particular, a TPO substrate.

In light of the above-mentioned situation, the inventors have made eager investigations so as to find out that when a curable composition is used wherein a polyolefin polymer and a tackifying resin are blended with a reactive silicon group-containing polyoxyalkylene polymer, adhesiveness to adhesion-resistant substrate can be certainly kept. Thus, the invention has been made.

Accordingly, the present invention relates to: A curable composition, comprising: (A) a polyoxyalkylene polymer having reactive silicon group(s) represented by the following general formula (1):

$$—Si(R^1_{3-a})X_a \quad (1)$$

wherein $R^1$ represents an alkyl group having 1 to 20 carbon atoms, an aryl group having 6 to 20 carbon atoms, an aralkyl group having 7 to 20 carbon atoms, or a triorganosiloxy group represented by $R_3SiO—$ [wherein three Rs may be the same or different and are each a monovalent hydrocarbon group having 1 to 20 carbon atoms] provided that when two $R^1$s are present, they may be the same or different, X represents a hydroxyl group or a hydrolyzable group provided that when two or more Xs are present, they may be the same or different, and "a" represents 1, 2 or 3; (B) a polyolefin polymer; and (C) a tackifying resin.

The above mentioned component (A) may have a main chain skeleton of polyoxypropylene.

The above mentioned component (A) may have, in the molecule thereof, a group represented by the following general formula (2):

$$—NR^2—C(=O)— \quad (2)$$

wherein $R^2$ represents a hydrogen atom, an alkyl group having 1 to 20 carbon atoms, an aryl group having 6 to 20 carbon atoms, or an aralkyl group having 7 to 20 carbon atoms.

The above mentioned component (B) may be a chlorinated polyolefin polymer.

The abovementioned component (B) has a main chain skeleton a part or the whole of which may be polypropylene.

The above mentioned component (B) may be a polymer modified with acryl, maleic acid, and/or maleic anhydride.

The above mentioned component (C) may be a hydroxyl group-containing hydrogenated petroleum resin.

The curable composition of the present invention may further comprises a plasticizer (D).

The present invention also relate to an adhesive for waterproof sheets, wherein any of the above mentioned curable composition is used.

The present invention also relate to an industrial adhesive, wherein any one of the above mentioned curable composition is used.

The curable composition of the invention is useful as an adhesive for adhesion-resistant substrates which exhibits an excellent adhesiveness to a rubbery substrate and a polyolefin substrate. In particular, the curable composition can be used as an adhesive for those have been hitherto known as adhesion-resistant substrates, e.g., a TPO substrate.

DETAILED DESCRIPTION OF THE INVENTION

The main chain skeleton of the polyoxyalkylene polymer, which has reactive silicon group(s) (A), in the present invention, may be a skeleton essentially having repeating units each represented by the following general formula (3):

$$—R^3—O— \quad (3)$$

wherein $R^3$ is a bivalent organic group, and represents a linear or branched alkylene group having 1 to 14 carbon atoms.

Specific examples of the repeating unit represented by the general formula (3) include $—CH_2CH_2O—$, $—CH(CH_3)CH_2O—$, $—CH(C_2H_5)CH_2O—$, $—C(CH_3)_2CH_2O—$, and $—CH_2CH_2CH_2CH_2O—$.

The main chain skeleton of the polyoxyalkylene polymer may be made of a species of repeating unit, or two or more species of repeating units. Particularly preferred is a polyoxypropylene wherein repeating units are each $—CH(CH_3)$ $CH_2O$— since the polymer is amorphous so that the polymer can be appropriately made into a low viscosity and an appropriate flexibility can be given to the cured product.

Examples of the method for synthesizing the polyoxyalkylene polymer include a polymerization method with the use of an alkali catalyst such as KOH; a polymerization method based on a transition metal compound-porphyrin complex catalyst, such as a complex obtained by causing an organic aluminum compound and porphyrin to react with each other described in, for example, Japanese Laid-Open Patent Application No. 61-215623; and a polymerization method based on a double metal cyanide complex catalyst described in, for example, Japanese Patent Publication (Kokoku) 46-27250 and Japanese Publication of examined application (Kokoku) No. 59-15336. However, the method is not particularly limited.

In the reactive silicon group-containing polyoxyalkylene polymer (A) of the present invention, the reactive silicon group is a group which has a hydroxyl group or hydrolyzable group bonded to a silicon atom, and can form a siloxane bond by a reaction catalyzed with a silanol condensation catalyst. The reactive silicon group may be a group represented by the following general formula (1):

$$—Si(R^1{}_{3-a})X_a \quad (1)$$

wherein $R^1$ represents an alkyl group having 1 to 20 carbon atoms, an aryl group having 6 to 20 carbon atoms, an aralkyl group having 7 to 20 carbon atoms, or a triorganosiloxy group represented by $R_3SiO$— [wherein three Rs may be the same or different and are each a monovalent hydrocarbon group having 1 to 20 carbon atoms] provided that when two $R^1$s are present, they may be the same or different, X represents a hydroxyl group or a hydrolyzable group provided that when two or more Xs are present, they may be the same or different, and "a" represents 1, 2 or 3.

When X in the general formula (1) is a hydrolyzable group, X is not particularly limited as long as X is a known hydrolyzable group. Specific examples thereof include hydrogen and halogen atoms; and alkoxy, acyloxy, ketoximate, amino, amide, acid amide, aminooxy, mercapto, and alkenyloxy groups. Out of these, alkoxy groups such as methoxy, ethoxy, propoxy and isopropoxy groups are in particular preferred since the hydrolyzability thereof is mild so that the compound is easily handled.

$R^1$ in the general formula (1) is not particularly limited and may be an alkyl group having 1 to 20 carbon atoms, an aryl group having 6 to 20 carbon atoms, or an aralkyl group having 7 to 20 carbon atoms. Specific examples thereof include alkyl groups such as methyl, ethyl, propyl and isopropyl groups, aryl groups such as a phenyl group, and aralkyl groups such as a benzyl group. Out of these groups, a methyl group is particularly preferred from the viewpoint of the availability of the starting material.

A specific structure of the reactive silicon group represented by the general formula (1) is not particularly limited as long as the structure is known. Particularly preferred are trimethoxysilyl, methyldimethoxysilyl, triethoxysilyl, and methyldiethoxysilyl groups from the viewpoint of the reactivity and the availability thereof.

About the reactive silicon group, one species, or two or more species thereof may be used together.

It is advisable that the introduction of the reactive silicon group into the polyoxyalkylene polymer is performed by a known method. Examples thereof include the following methods:

(i) An polyoxyalkylene polymer having in the molecule thereof a functional group such as a hydroxy group is caused to react with an organic compound having an active group exhibiting reactivity with the functional group and having an unsaturated group, thereby yielding an polyoxyalkylene polymer having the unsaturated group. Alternatively, for example, when an epoxide is subjected to ring-opening polymerization to yield an polyoxyalkylene polymer, an unsaturated group-containing epoxide is ring-opening-copolymerized therewith to yield an unsaturated group-containing polyoxyalkylene polymer. In such a way, a monomer having an unsaturated group unrelated to any polymerization reaction is copolymerized, thereby yielding an unsaturated group-containing organic polymer. Next, a hydrosilane having a reactive silicon group is caused to act onto the resultant reaction production, thereby the reaction product is hydrosilylated.

In order to introduce the reactive silicon group at a high introduction ratio in the method (i), it is preferred to add a hydrosilane compound to an organic polymer containing an unsaturated group represented by $CH_2=C(R^4)—CH_2—$ or $CH(R^4)=CH—CH_2—$ wherein $R^4$ represents hydrogen or a hydrocarbon group having 1 to 10 carbon atoms, thereby attaining the introduction. More preferably, $R^4$ is hydrogen or a methyl group. In order to set the introduction ratio of the reactive silicon group to 85% or more, it is particularly important that $R^4$ is a methyl group.

Specific examples of the hydrosilane compound used in the method (i) include halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, and phenyldimethoxysilane; acyloxysilanes such as methyldiacetoxysilane, and phenyldiacetoxysilane; and ketoximate silanes such as bis(dimethyl ketoximate)methylsilane, and bis(cyclohexyl ketoximate)methylsilane. However, the hydrosilane compound is not limited thereto. Out of these compounds, halogenated silanes and alkoxysilanes are particularly preferred, and alkoxysilanes are most preferred since the hydrolyzability of the composition obtained therefrom is mild so that the composition is easily handled.

(ii) A compound having a mercapto group and a reactive silicon group are caused to react with an unsaturated group-containing polyoxyalkylene polymer obtained in the same manner in the method (i).

The synthesis method (ii) is, for example, a method of introducing a compound having a mercapto group and a reactive silicon group into an unsaturated bond moiety of an organic polymer by radical addition reaction in the presence of a radical initiator and/or a radical generating source. However, the method is not particularly limited. Specific examples of the compound having a mercapto group and a reactive silicon group include, but not limited to, γ-mercaptopropyltrimethoxysilane, γ-mercaptopropylmethyldimethoxysilane, γ-mercaptopropyltriethoxysilane, and γ-mercaptopropylmethyldiethoxysilane.

(iii) An polyoxyalkylene polymer having in the molecule thereof a functional group such as a hydroxyl group, an epoxy group, or an isocyanate group is caused to react with a compound having a functional group having reactivity to the former functional group and having a reactive silicon group. The functional groups of the compound are not limited, but isocyanate group or amino group is preferable. Isocyanate group is particularly preferable.

Out of individuals of the synthesis method (iii), the method for causing an polyoxyalkylene polymer having a hydroxyl group at its terminal to react with a compound having an isocyanate group and a reactive silicon group is, for example, a method described in Japanese Laid-Open Patent Application No. 3-47825. However, the method is not particularly limited. Specific examples of the compound having an isocyanate group and a reactive silicon group include γ-isocyanatopropyltrimethoxysilane, γ-isocyanatopropylmethyldimethoxysilane, γ-isocyanatopropyltriethoxysilane, and γ-isocyanatopropylmethyldiethoxysilane. However, the compound is not limited thereto.

Out of the above-mentioned methods, method (i) or (iii) is preferred since the polymer obtained by the method (ii) emits a strong odor based on the mercaptosilane. In connection with the method for introducing the reactive silicon group, the organic polymer obtained by the method (i), which has the reactive silicon group(s), is more preferred than the polymer obtained by the method (iii) since the polymer becomes a composition having a low viscosity and a good workability. On the other hand, the method (iii) is preferred since the introduction of a silyl group into a hydroxyl group-containing polymer can be attained only in one step so that the component (A) can be produced with a good productivity.

Out of individuals of the method (iii), preferred is a method of causing a polyoxyalkylene polymer having a hydroxyl group at its terminal to react with a compound having an isocyanate group and a reactive silicon group since a high conversion ratio is obtained in a relatively short reaction time. An oxyalkylene polymer obtained by such a reaction is a polymer having the reactive silicon group(s) and a group represented by the following general formula (2):

$$—NR^2—C(=O)—  \quad (2)$$

wherein $R^2$ represents a hydrogen atom, an alkyl group having 1 to 20 carbon atoms, an aryl group having 6 to 20 carbon atoms, or an aralkyl group having 7 to 20 carbon atoms.

The component (A) having a group represented by the general formula (2) can also be obtained by a method other than the above mentioned methods. Specifically, a compound obtained by a chain elongating reaction of a polyol having repeating units of the general formula (3), as defined previously, with a diisocyanate compound, for example, an aromatic polyisocyanate, such as toluene(tolylene)diisocyanate, diphenylmethanediisocyanate or xylylenediisocyanate, or an aliphatic polyisocyanate, such as isophoronediisocyanate or hexamethylenediisocyanate, is a compound having a group of the general formula (2) regardless of the method for introducing the reactive silicon group.

The component (A) may be linear or branched, and the number-average molecular weight thereof is preferably 3,000 or more, and is realistically 100,000 or less in terms of polystyrene based on gel permeation chromatography (GPC). The number-average molecular weight is more preferably 10,000 or more and 50,000 or less. If the number-average molecular weight is less than 10,000, the hardness of the composition is high so that inconveniences tend to be caused. If the molecular weight is more than 50,000, the composition comes to have a high viscosity so that inconveniences tend to be caused from the viewpoint of workability. The molecular weight is measured with the use of HLC-8120GPC (TOSOH CORPORATION) as a solution sending system, TSK-GEL H type column (TOSOH CORPORATION), and THF solvent.

The reactive silicon group in the component (A) may be bonded to a terminal of the polyoxyalkylene polymer or the inside thereof, or a plurality of the reactive silicon groups may be bonded to both of a terminal thereof and the inside thereof. In particular, when the reactive silicon group is bonded only to the molecule terminal, the network of the polymer component contained in the composition is effectively constructed. Thus, this case is preferred since a rubbery cured product high in strength and elongation is easily obtained.

As the method for measuring the introduction ratio of the reactive silicon groups in the component (A), various methods can be used. The ratio can be calculated from the integral value of the terminals to which the reactive silicon groups are introduced on the basis of the $^1$H-NMR spectrum thereof. The introduction ratio of the reactive silicon groups is a numerical value obtained by representing, in percentage, the value obtained by dividing the number of the reactive silicon groups present in the molecule by the number of the terminals of the molecule. Specifically, in the case of a linear polymer (that is, a polymer having two molecular terminals), having in a single molecule thereof two reactive silicon groups on average an introduction ratio of 100% is calculated out. For this reason, about a polymer wherein many reactive silicon groups are present at moieties other than terminals of the molecule, the calculated value of the introduction ratio may be over 100%. In the present invention a polymer having reactive silicon groups only at their both termini can be preferably used. Usually a polymer of introduction ratio of less than 85% is used. Polyoxyalkylene polymer having reactive silicon groups only at their both termini can be prepared as follows:

(a) Hydroxyl groups that are present only at the termini of a polyoxyalkylene polymer is converted to —OM groups (wherein M is Na or K). The resulting polymer is reacted with an organic halogen compound represented by the formula $CH_2=C(R^4)—CH_2—Z$ (wherein $R^4$ is the same as defined above and Z is halogen atom) to obtain polyoxyalkylene polymer having an unsaturated groups only at its termini. A hydrosilane compound represented by the formula H—Si($R^1_{3-a}$)$X_a$ (wherein $R^1$, X, and a are the same as defined above) is added to react with a polyoxyalkylene polymer having an unsaturated groups only at its termini to obtain a polyoxyalkylene polymer with reactive silicon groups only at its termini.

(b) A polyoxyalkylene polymer having hydroxyl groups only at the termini is reacted with a compound having isocyanate group and a group represented by the formula H—Si($R^1_{3-a}$)$X_a$ (wherein $R^1$, X, and a are the same as defined above) to obtain a polyoxyalkylene polymer with reactive silicon groups only at its termini.

The number of the reactive silicon groups in a single molecule of the polymer of the component (A) is preferably 1 or more on average, and is preferably from 1.1 to 5. If the number of the reactive silicon groups contained in the molecule is less than 1, the hardening of the cured product becomes insufficient so that a good rubbery elasticity may not be obtained. If the number is over 5, the cured product becomes hard and brittle so that the rubbery elasticity unfavorably becomes poor.

Specific examples of the polyoxyalkylene polymer (A), which has reactive silicon group(s), are suggested in Japanese Publication of examined patent application (Kokoku) No. 45-36319, Japanese Publication of examined patent application (Kokoku) No. 46-12154, Japanese Laid-Open Patent Application NO. 50-156599, Japanese Laid-Open Patent Application No. 54-6096, Japanese Laid-Open Patent Application No. 55-13767, Japanese Laid-Open Patent Application No. 55-13468, Japanese Laid-Open Patent Application No. 57-164123, Japanese Publication of examined patent application (Kokoku) No. 3-2450, U.S. Pat. Nos. 3,632,557, 4,345, 053, 4,366,307 and 4,960,844, and others. Other examples thereof are polyoxyalkylene polymers suggested in Japanese Laid-Open Patent Application No. 61-197631, Japanese Laid-Open Patent Application No. 61-215622, Japanese Laid-Open Patent Application No. 61-215623 and Japanese Laid-Open Patent Application No. 61-218632. The polyoxyalkylene polymers are polymers having a number-average molecular weight of 6,000 or more and a molecular weight distribution (Mw/Mn) of 1.6 or less and having reactive silicon group(s), which have a high molecular weight and a narrow molecular weight distribution. However, the component (A) is not particularly limited thereto.

The above-mentioned polyoxyalkylene polymers, which each have reactive silicon group(s), may be used alone or in combination of two or more thereof.

The polyolefin polymer (B) used in the present invention is not particularly limited, and may be known one. Specific examples thereof include polyolefin homopolymers, such as ethylene, propylene and butylene, and copolymers thereof; ethylene-propylene-diene based rubber (EPDM) and modified products thereof; chlorinated polyolefins such as chlorinated polyethylene and chlorinated polypropylene, copolymers thereof, and the chlorinated polyolefins modified with acryl, maleic acid and/or maleic anhydride; copolymers made from an olefin and a carboxylic acid monomer, such as ethylene-acrylic acid copolymer, and isobutylene-maleic anhydride copolymer.

The component (B) may be a block copolymer having in a single molecule thereof soft segments and hard segments, the copolymer being known as a thermoplastic elastomer.

The hard segments may be segments each having a structural unit of an aromatic vinyl monomer. Specific examples of the monomer include styrene, α-methylstyrene, and indene.

The soft segments may be specifically made of, for example, a conjugated diene polymer such as polybutadiene or polyisoprene; or a polyolefin elastomer such as ethylene/butylene copolymer, ethylene/propylene copolymer, or polyisobutene.

Specific examples of such a thermoplastic elastomer include styrene-butadiene-styrene block polymer (SBS), styrene-isoprene-styrene block polymer (SIS), styrene-ethylene/butylene-styrene block polymer (SEBS), styrene-ethylene/propylene-styrene block polymer (SEPS), styrene-isobutene-styrene block polymer (SIBS), and styrene-ethylene/propylene block polymer (SEP).

The tackifying resin (C) used in the present invention is not particularly limited, and may be known one. Specific examples thereof include petroleum resins such as aliphatic petroleum resin, aromatic petroleum resin, aliphatic/aromatic hybrid type petroleum resin, phenol modified aliphatic/aromatic hybrid type petroleum resin, dicyclopentadiene based petroleum resin, and hydrogenated petroleum resin; rosin acid, disproportionated rosin acid, hydrogenated rosin acid, glycerin ester of rosin acid, pentaerythritol ester of rosin acid, and other rosin acid ester resins; terpene based resins such as terpene resin, hydrogenated terpene resin, aromatic modified terpene resin, aromatic modified hydrogenated terpene resin, phenol modified terpene resin (terpene phenol resin), and alkylphenol modified terpene resin; styrene resins; xylene based resins such as xylene resin, phenol modified xylene resin, alkylphenol modified xylene resin; and phenol based resins such as novolak type phenol resin, resol type phenol resin, alkylphenol resin, and rosin modified phenol resin.

These tackifying resins may be used alone or in combination of two or more thereof.

Out of these tackifying resins, petroleum resins are preferred from the viewpoint of the compatibility thereof with the components (A) and (B) and an improvement in the dispersion stability of the components. Hydrogenated petroleum resins are more preferred, and hydroxyl group-containing hydrogenated petroleum resins are particularly preferred.

Hydroxyl group-containing hydrogenated petroleum resins usable herein refer to hydrogenated petroleum resins containing hydroxyl group(s) in their molecular structure due to some chemical bonding. Hydroxyl group-containing hydrogenated petroleum resins can be obtained by hydrogenating hydroxyl group-containing petroleum resin. As for hydroxyl group-containing petroleum resins, those resins include petroleum fractions and have hydroxyl groups can be used without limitation. Methods for producing such hydroxyl group-containing petroleum resins are not limited. For example, such petroleum resin can be obtained by reacting polymerizable monomers contained in petroleum fractions generated by pyrolysis of naphtha (C5 fraction and C9 fraction) with hydroxyl group-containing compounds.

Examples of polymerizable monomers contained in petroleum fractions are isoprene, n-pentene, methylbutene, pentadiene, cyclopentene and like monomers of the C5 fraction; styrene, vinyltoluene, alpha-methylstyrene, indene, methyl indene and like monomers of the C9 fraction; cyclopentadiene, methylcyclopentadiene, ethylcyclopentadiene and like monomers of the cyclopentadiene portion including the dimers, trimers and codimers thereof; etc.

Hydroxyl group-containing compounds refer to phenolic compounds and hydroxyl group-containing olefins. Examples thereof include phenols; cresol, xylenol, p-tert-butylphenol, p-octylphenol, nonylphenol, vinylphenol and like alkyl-substituted phenols; allyl alcohol, crotyl alcohol, 1,4-butenediol, hydroxyethyl acrylate, hydroxyethyl methacrylate; 3-methyl-2-propene-1-ol, 2-methyl-2-propene-1-ol and like alkyl-substituted allyl alcohols; etc.

Methods for producing the hydroxyl group-containing petroleum resins are not limited, and known methods can be employed. Examples include a method wherein a polymerizable monomer and a hydroxyl group-containing compound are polymerized in the presence of a Friedel-Crafts catalyst; a method wherein a polymerizable monomer and a hydroxyl group-containing compound are polymerized in the presence of a radical polymerization initiator; a method wherein a polymerizable monomer and a hydroxyl group-containing compound are thermally polymerized in an autoclave; and like methods.

Hydroxyl group-containing petroleum resins can also be obtained by a method wherein (meth)acrylate alkyl esters are thermally polymerized with petroleum fractions so that ester groups are introduced into petroleum resin, and then such ester groups is reduced, a method wherein double bonds are remained or newly introduced to petroleum resin and then such double bonds are hydrated, or a method wherein vinyl carbonate such as vinyl acetate are thermally polymerized with petroleum fractions so that acyloxy groups are introduced into petroleum resin, and then such acyloxy groups are hydrolyzed.

Alcohol-modified petroleum resin and phenol-modified petroleum resin are preferable as hydroxyl group-containing petroleum resins. Specifically, as for alcohol-modified petroleum resin, alcohol-modified dicyclopentadiene resins which can be obtained by copolymerization of dicyclopentadiene and allyl alcohol, are particularly preferable since controlling of hydroxyl value is easy. As for phenol-modified petroleum resin, phenol-modified C9 petroleum resin that can be obtained by cationic polymerization of C9 fraction in the presence of phenol compounds is preferable, due to its low price and workability.

The amount of hydroxyl groups included in the petroleum resin is not limited, but hydroxyl value of about 10 to 300 is preferable for alcohol-modified petroleum resin. Since smaller hydroxyl value may result in turbidity of final composition, hydroxyl group of 50 or more is more preferable. Also, larger hydroxyl value may result in smaller molecular weight and inferior heat resistance property, thus hydroxyl group of 250 or less is more preferable. To prepare alcohol-modified dicyclopentadiene petroleum resin with hydroxyl value of such range, 10 to 250 parts by weight of alcohol compound can be copolymerized with 100 parts by weight of dicyclopentadiene.

Hydroxyl value of about 5 to 100 is preferable for phenol-modified petroleum resin. Since smaller hydroxyl value may result in turbidity of final composition, hydroxyl group of 20 or more is more preferable. Also, larger hydroxyl value may result in smaller molecular weight and inferior heat resistance property, thus hydroxyl group of 90 or less is more preferable. To prepare phenol-modified C9 petroleum resin with hydroxyl value of such range, 5 to 65 parts, preferably 10 to 50 parts by weight of phenol compound can be used per 100 parts by weight of C9 fraction.

Preferable softening point of hydroxyl group-containing petroleum resin thus obtained is about 60 to 200° C. More preferable lower limit of softening point is 90° C. and further more preferable is 120° C. Upper limit of softening point is preferably 180° C. Glass transition temperature (Tg) of hydroxyl group-containing petroleum resin is about 30 to 150° C. More preferable glass transition temperature is 60 to 130° C.

The average molecular weight of hydroxyl group-containing petroleum resin is not limited, but number average molecular weight of 200 to 3000 is preferable. Since smaller number average molecular weight may result in lower softening point and inferior heat resistance property, number average molecular weight of 300 or more is more preferable. Also, larger number average molecular weight may result in difficulty of mixing property due to higher softening points, thus number average molecular weight of 2000 or less is preferable.

The hydroxyl group-containing hydrogenated petroleum resin of the present invention is produced by hydrogenating the above-described alcohol-modified petroleum resin or phenol-modified petroleum resin. The hydrogenation degree of the hydrate is 5 to 100%. For example, in case of alcohol-modified dicyclopentadiene petroleum resin, hydrogenation degree of 90 to 100% of olefin moiety is preferable and in case of phenol-modified C9 petroleum resin, hydrogenation degree of 5 to 20% for an aromatic ring is preferable. Preferable properties such as the softening point, hydroxyl value, average molecular weight, and the like of the hydrate are similar with those of unhydrogenated resin. Those properties, however, can be adjusted optionally since the properties are varied with the hydrogenating conditions.

The hydrogenation reaction can be performed under the following reaction conditions: a reaction pressure of 1 to 30 MPa, preferably 3 to 25 MPa; a reaction temperature of 100 to 400° C., preferably 140 to 350° C. When the pressure is below 1 MPa, or the temperature is below 140° C., hydrogenation reaction does not proceed smoothly without adding reaction solvent and the color tone of resulting hydrate becomes 3 or more Gardner. The reaction temperature of above 300° C. is not preferable, since hydrogenolysis of the resin proceed excessively. The reaction time is usually 10 min. to 7 hours, preferably 20 min. to 7 hours. Of course, the reaction conditions other than those described above can be used by e.g., using appropriate catalyst under the pressure of 1 MPa or less.

Known hydrogenating catalyst such as nickel, palladium, cobalt, platinum, rhodium, ruthenium, or rhenium, or their oxide, or their sulfide, can be used. Such hydrogenating catalyst can optionally be supported by a carrier such as alumina, silica (diatomaceous earth), carbon, or titania, which are porous and have a large surface area. Among such catalysts, for the efficient hydrogenation of unsaturated bonds, nickel-diatomaceous earth catalyst is preferable. The amount of such catalyst used is usually 0.01 to 5% by weight of resin material.

The hydrogenation reaction can be performed by melting resin material or dissolving resin material in solvent. Any solvent that is inactive to reaction, and can easily dissolve materials and reaction products, can be used. For example, cyclohexane, n-hexane, n-pentane, decaline, isopropylalcohol, or tetrahydrofuran, or the combination of two or more of the above can be used. The amount of solvent is not limited, but 10% by weight or more of dry solid contents and preferably, 10 to 70% by weight of dry solid contents per material resin can be used.

The preferable conditions in case of batch-wise reaction are described above. Other reaction manners, such as circulation type (fixed floor type or circulating floor type) can also be employed.

The curable composition of the present invention include 1 to 100 parts by weight, and preferably 1 to 50 parts by weight of the component (B) per 100 parts by weight of the component (A). Also, 1 to 100 parts by weight, and preferably 1 to 50 parts by weight of the component (C) per 100 parts by weight of the component (A) are included.

In the invention, it is preferred to add a plasticizer (D) thereto in order to improve the workability of the curable composition, improve the dispersion stability of the components (A) and (B), and attain other purposes.

The plasticizer is not particularly limited, and may be known one. Specifically, for example, the following can be used: phenyl alkylsulfonates such as Mesamoll manufactured by Bayer, and Mesamoll II manufactured by Bayer; aromatic oligomers such as biphenyl and triphenyl, and completely- or partially-hydrogenated products thereof; polyvinyl oligomers such as polybutene, and hydrogenated polybutene; hydrogenated polyene oligomers such as liquid hydrogenated polybutadiene; paraffins such as paraffin oil, and paraffin oil chloride; cycloparaffins such as naphthene oil; phthalic acid esters such as dibutyl phthalate, di(2-ethylhexyl)phthalate, di-n-octyl phthalate, diisononyl phthalate, and diisodecyl phthalate; non-aromatic dibasic acid esters such as di(2-ethylhexyl)adipate, di-n-octyl adipate, diisononyl adipate, diisodecyl adipate, and di(2-ethylhexyl)sebacate; aliphatic oils such as linseed oil, soybean oil, and tung oil; aromatic esters such as tri 2-ethylhexyl trimellitate, and triisodecyl trimellitate; and aliphatic acid esters such as butyl oleate. These plasticizers may be used alone or in combination of two or more thereof.

It is more preferred to use, out of these plasticizers, a phenyl alkylsulfonate together with an aromatic oligomer and a completely or partially hydrogenated product thereof in order to improve the dispersion stability of the components (A) and (B). Furthermore, it is particularly preferred that the added amount of the phenyl alkylsulfonate is not over the added amount of the aromatic oligomer and the completely or partially hydrogenated product thereof.

If the added amount of the aromatic oligomer and the completely or partially hydrogenated product thereof is below the added amount of the other plasticizer, the adhesiveness of resulting composition to a TPO substrate unfavorably falls.

It is allowable to blend a vinyl polymer having reactive silicon group(s) with the component (A) of the present invention and mix the blend with the component (B) and component (C) to prepare the curable composition.

The method for blending the vinyl polymer having reactive silicon group(s) and polyoxyalkylene polymer having reactive silicon group(s) is described in Japanese Laid-Open Patent Application No. 59-122541, Japanese Laid-Open Patent Application No. 63-112642, Japanese Laid-Open Patent Application No. 6-172631, and others.

A preferred specific example thereof is a method of blending a polyoxyalkylene polymer having reactive silicon group(s) with a copolymer having a molecular chain which is substantially composed of: acrylic acid ester monomer units and/or methacrylic acid ester monomer units each represented by the following general formula (6), which each have an alkyl group having 1 to 8 carbon atoms; and acrylic acid ester monomer units and/or methacrylic acid ester monomer units each represented by the following general formula (7), which each have an alkyl group having 10 or more carbon atoms, thereby attaining the production:

$$-CH_2-C(R^5)(COOR^6)- \quad (6)$$

wherein $R^5$ represents a hydrogen atom or a methyl group, and $R^6$ represents an alkyl group having 1 to 8 carbon atoms, and $$-CH_2-C(R^5)COOR^7- \quad (7)$$

wherein $R^5$ has the same meanings as described above, and $R^7$ represents an alkyl group having 10 or more carbon atoms.

Examples of $R^6$ in the general formula (6) include alkyl groups having 1 to 8 carbon atoms, preferably 1 to 4 carbon atoms, more preferably 1 to 2 carbon atoms, such as methyl, ethyl, propyl, n-butyl, tert-butyl, and 2-ethylhexyl groups. For $R^6$s, the alkyl groups may be used alone, or may be used in combination of two or more thereof.

Examples of $R^7$ in the general formula (7) include long-chain alkyl groups having 10 or more carbon atoms, usually 10 to 30 carbon atoms, preferably 10 to 20 carbon atoms, such as lauryl, tridecyl, cetyl, stearyl, and behenyl groups. For $R^7$s, the alkyl groups may be used alone, or may be used in combination of two or more thereof.

The molecular chain of the vinyl copolymer is substantially composed of the monomer units of the general formulae (6) and (7). The word "substantially" herein means that the total amount of the monomer units of the general formulae (6) and (7) present in the copolymer is more than 50% by weight, and preferably means that the total amount of the monomer units of the general formulae (6) and (7) is more than 70% by weight.

The abundance ratio (or the presence ratio) by weight of the monomer units of the general formula (6) to the monomer units of the general formula (7) is preferably from 95/5 to 40/60, more preferably from 90/10 to 60/40.

Examples of a monomer unit which may be contained in the copolymer other than the monomer units of the general formulae (6) and (7), include acrylic acids such as acrylic acid and methacrylic acid; amide groups such as acrylamide, methacrylamide, N-methylolacrylamide, and N-methylolmethacrylamide; epoxy groups such as glycidyl acrylate, and glycidyl methacrylate; amino group-containing monomers such as diethylaminoethyl acrylate, diethylaminoethyl methacrylate, and aminoethyl vinyl ether; other monomer units originating from acrylonitrile, styrene, α-methylstyrene, alkyl vinyl ether, vinyl chloride, vinyl acetate, vinyl propionate, ethylene, or the like.

As the copolymer, a copolymer having a number-average molecular weight of 500 to 100,000 is preferred since the copolymer is easily handled.

The reactive silicon group or each of the reactive silicon groups which the copolymer has may be a group represented by the following general formula (8):

$$-Si(R^1_{3-a})X_a \quad (8)$$

wherein $R^1$, X and a are the same as described above.

The number of the reactive silicon groups in the copolymer is preferably 1 or more, more preferably 1.1 or more, in particular preferably 1.5 or more on average per molecule in order to gain a sufficient curability.

Specific examples of the hydrolyzable group in the general formula (8) include halogen atoms, a hydrogen atom, and alkoxyl, acyloxy, ketoximate, amino, amide, aminooxy, mercapto, and alkenyloxy groups.

Further, other methods for producing the organic polymer which is a blend with the vinyl polymer having reactive silicon group(s) include polymerizing an acrylic acid ester monomer and/or a methacrylic acid ester monomer in the presence of a polyoxyalkylene polymer having reactive silicon group(s). This producing method is specifically disclosed in Japanese Laid-Open Patent Application No. 59-78223, Japanese Laid-Open Patent Application No. 59-168014, Japanese Laid-Open Patent Application No. 60-228516, Japanese Laid-Open Patent Application No. 60-228517, and others. However, the producing method is not limited thereto.

If necessary, an epoxy resin may be added to the curable composition of the invention.

The epoxy resin is not particularly limited, and may be known one. Specific examples thereof include bisphenol A type epoxy resin, bisphenol F type epoxy resin, hydrogenated bisphenol A type epoxy resin, urethane modified epoxy resin, alicyclic epoxy resin, novolak type epoxy resin, polyalkylene glycol diglycidyl ether, polyglycidyl ether of a polyhydric alcohol such as glycerin, flame-retardant epoxy resins such as diglycidyl ether of tetrabromobisphenol A, and diglycidyl ether of an alkylene oxide adduct of bisphenol A.

Out of these epoxy resins, epoxy resins each having in the molecule thereof at least two epoxy groups are preferred for the following reasons: the reactivity is high when the resin is cured; and the cured product easily forms a three-dimensional network structure. Particularly preferred is bisphenol A type epoxy resin or novolak type epoxy resin.

When the epoxy resin is added to the curable composition of the invention, a curing agent for curing the epoxy resin may be used together. The epoxy resin curing agent that can be used is not particularly limited, and may be a known epoxy resin curing agent. Specific examples thereof include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, and amine-terminated polyether; tertiary amines such as 2,4,6-tris(dimethylaminomethyl)phenol and tripropylamine, and salts of these tertiary amines; polyamide resins; imidazole compounds; dicyandiamide compounds; carboxylic anhydrides such as phthalic anhydride, hexahydrophthalic anhydride, tetrahydrophthalic anhydride, and pyromellitic anhydride; alcohol compounds; phenol compounds; and carboxylic acid compounds. These curing agents may be used alone or in combination of two or more thereof.

As the epoxy resin curing agent, a ketimine compound may be used. The ketimine compound is stably present in the absence of water content, and is decomposed into a primary amine and a ketone by water content. The resultant primary amine becomes a curing agent for epoxy resin. When the ketimine compound is used, a one-component composition can be obtained. This ketimine compound can be obtained by condensation reaction between an amine compound and a carbonyl compound.

If necessary, a silanol condensation catalyst, an adhesion-imparting agent, a filler, a thixotropic agent, an anti-aging agent, and other various additives can be further added to the curable composition of the invention.

The silanol condensation catalyst is not particularly limited, and may be known one. Specific examples thereof include titanium compounds such as tetrabutyl titanate, tetrapropyl titanate, and titanium tetraacetylacetonate; quadrivalent tin compounds such as dibutyltin dilaurate, dibutyltin maleate, dibutyltin phthalate, dibutyltin dioctate, dibutyltin diethylhexanolate, dibutyltin dimethylmaleate, dibutyltin diethylmaleate, dibutyltin dibutylmaleate, dibutyltin dioctylmaleate, dibutyltin ditridecylmaleate, dibutyltin dibenzylmaleate, dibutyltin diacetate, dioctyltin diethylmaleate, dioctyltin dioctylmaleate, dibutyltin dimethoxide, dibutyltin dinonylphenoxide, dibutenyltin oxide, dibutyltin diacetylacetonate, dibutyltin diethylacetoacetonate, and a reaction product of dibutyltin oxide and a phthalic acid ester; bivalent tin compounds such as tin octylate, tin naphthenate, and tin stearate; organic aluminum compounds such as aluminum trisacetylacetonate, aluminum trisethylacetoacetate, and diisopropoxyaluminum ethylacetoacetate; zirconium compounds such as zirconium tetraacetylacetonate; lead octylate; amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo(5,4,0)undecene-7 (DBU), or salts of these amine compounds combined with a carboxylic acid or the like; low molecular weight polyamide resins each obtained from an excessive amount of polyamine and a polybasic acid; reaction products each made from an excessive amount of a polyamine and an epoxy compound; amine group-containing silane coupling agents such as γ-aminopropyltrimethoxysilane, and N-(β-aminoethyl)-γ-aminopropylmethyldimethoxysilane; and other known silanol condensation catalysts such as acidic catalysts and basic catalysts. These catalysts may be used alone or in combination of two or more thereof.

The amount of these curable catalysts used is preferably from 0.1 to 20 parts by weight, in particular preferably from 1 to 10 parts by weight for 100 parts by weight of the component (A). If the used amount of the curing catalyst is too small, the curing speed becomes slow and the curing reaction does not advance sufficiently. Thus, this case is not preferred. On the other hand, if the used amount of the curing catalyst is too large, local heating or foaming is generated when the composition is cured. A good cured product is not obtained with ease, thus unfavorable.

The adhesion-imparting agent is not particularly limited, and may be known one such as a silane coupling agent. Specific examples thereof include isocyanate group-containing silanes such as γ-isocyanatepropyltrimethoxysilane, γ-isocyanatepropyltriethoxysilane, γ-isocyanatepropylmethyldiethoxysilane, and γ-isocyanatepropylmethyldimethoxysilane; amino group-containing silanes such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, γ-ureidopropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; vinyl unsaturated group-containing silanes such as vinyltrimethoxysilane, vinyltriethoxysilane, γ-methacryloyloxypropylmethyldimethoxysilane, and γ-acryloyloxypropylmethyltriethoxysilane; and isocyanurate type silanes such as tris(trimethoxysilyl)isocyanurate. Derivatives obtained by modifying these compounds can be used as the adhesion-imparting agent.

The adhesion-imparting agent used in the invention is used in an amount of 0.1 to 20 parts by weight for 100 parts by weight of the component (A). It is particularly preferred to use the agent in an amount ranging from 0.5 to 10 parts by weight.

The filler is not particularly limited, and may be known one. Specific examples thereof include inorganic fillers such as fumed silica, precipitating silica, silicic anhydride, silicic acid hydrate, carbon black, ground calcium carbonate, colloidal calcium carbonate, surface treated calcium carbonate, magnesium carbonate, calcium oxide, titanium oxide, calcium hydroxide, diatomaceous earth, calcined clay, clay, and talc; organic fillers such as PVC powder, and acrylic resin powder; fibrous fillers such as glass fiber; inorganic balloons such as volcanic soil balloon and glass balloon; and organic balloons such as phenol balloon. These fillers may be used alone or in combination of two or more thereof.

The filler is used preferably in an amount of 50 to 500 parts by weight, in particular preferably in an amount of 60 to 300 parts by weight for 100 parts by weight of the component (A). If the used amount of the filler is less than 50 parts by weight, the advantageous effects of the filler are not easily expressed. If the used amount is more than 500 parts by weight, the viscosity rises so that the workability may deteriorate.

The thixotropic agent is not particularly limited, and may be known one. Specific examples thereof include hydrogenated castor oil, organic amide wax, organic bentonite, and calcium stearate. These thixotropic agents may be used alone or in combination of two or more thereof.

The thixotropic agent is used preferably in amount of 0.1 to 50 parts by weight, in particular preferably in an amount of 1 to 30 for 100 parts by weight of the component (A). If the used amount of the thixotropic agent is less than 0.1 parts by weight, a sufficient thixotropy may not be obtained. If the used amount is more than 50 parts by weight, costs unfavorably increase.

The anti-aging agent is not particularly limited, and may be known one. Specific examples thereof include phenolic antioxidants, aromatic amine antioxidants, sulfurous-containing antioxidants, phosphorus antioxidants, benzotriazole based ultraviolet absorbents, benzoate based ultraviolet absorbents, benzophenone based ultraviolet absorbents, salicylate based ultraviolet absorbents, hindered amine light stabilizers, and nickel based light stabilizers.

The anti-aging agent is used preferably in an amount of 0.01 to 20 parts by weight, in particular preferably in an amount of 0.1 to 10 parts by weight for 100 parts by weight of the component (A).

These anti-aging agents may be used alone or in combination of two or more thereof. The use of two or more of the anti-aging agents may produce a more effective function than the use of only one thereof.

If necessary, various additives may be added to the curable composition of the invention in order to adjust various physical properties. Examples of the additives include a storage stability improver, a flame retardant, a curability adjustor, a radical inhibitor, a metal inactivating agent, an ozone deterioration inhibitor, a phosphorus-containing peroxide decomposer, a lubricant, a pigment, a foaming agent, a solvent, and an antifungal agent. These additives may be used alone or in combination of two or more thereof.

The process for producing the curable composition of the invention is not particularly limited, and may be known one. For example, the following can be used: a method of blending the above-mentioned individual components with each other, and kneading the blend by use of a planetary mixer, a paint roll, a kneader or the like; or a method of using a solvent to dissolve the individual components therein, and mixing the components. The curable composition of the invention can be made into a one-component type or two-component type curable composition.

The curable composition of the invention can be used as a sealing compound, an adhesive, a binder, an injection or impregnant, a waterproof material, a damping material, a sound insulating material, or the like in wide fields of civil engineering, architecture, industrial articles and others.

EXAMPLES

The curable composition of the invention will be described on the basis of the following examples; however, the invention is not limited to these examples.

Synthesis Example 1

Into a pressure-resistant reactor equipped with a stirrer were put 800 g of polyoxypropylene glycol having a number-average molecular weight of 5200, and 50.2 g of isophoronediisocyanate, and then the components were mixed. Thereafter, thereto was added 0.8 g of a tin catalyst (a 10% solution of dibutyltin dilaurate in DOP). The solution was stirred at 80° C. for 4 hours to yield an isocyanate group-terminated polymer having a molecular weight of about 15000 (the molecular weight was calculated out from the titration value (0.579%) of the isocyanate groups). The resultant was cooled to 60° C., and then thereto was added 1.0 eq per NCO-group of γ-aminopropyltrimethoxysilane. The solution was stirred for 30 minutes to yield a polyoxypropylene polymer having trimethoxysilyl group(s) at its molecular terminals and having a number-average molecular weight of 17000 (the molecular weight in terms of polystyrene, obtained by GPC) (polymer 1).

Synthesis Example 2

Polyoxypropylene diol having a number-average molecular weight of 2000 was used as an initiator to polymerize propylene oxide by use of a zinc hexacyanocobaltate glyme complex catalyst, thereby yielding polyoxypropylene glycol having a number-average molecular weight of 25500 (the molecular weight in terms of polystyrene, obtained by GPC). To 100 parts by weight of polyoxypropylene glycol obtained were added 1.8 parts by weight of γ-isocyanatepropyltrimethoxysilane, and the components were caused to react with each other at 90° C. for 5 hours, thereby yielding a trimethoxysilyl group-terminated polyoxypropylene polymer (polymer 2).

Examples 1 to 11, and Comparative Examples 1 to 4

Each component-blended agent having a composition shown in Tables 1 to 3 was kneaded by means of a 5 L planetary mixer, and then filled into a cartridge. In this way, one-component curable compositions of Examples 1 to 11 and Comparative Examples 1 to 4 were produced.

The resultant one-component curable compositions were used to make the following evaluations:

(Adhesiveness Test)

Each of the compositions was painted into a bead form onto various TPO substrate. The resultant was aged at 23° C. and 50% R.H. for 7 days. Thereafter, a knife was used to cut slightly an interface between an end portion of the bead-form cured product and the TPO substrate. The end portion, which was separated away from the substrate, was grasped by hand to peel off the whole of the cured product from the TPO substrate. The surface state of the TPO substrate portion from which the cured product was peeled off by hand was observed. A case where the cured product remained in the whole of the portion from which the cured product was peeled off is represented by "A" (which means excellent). A case where the cured product remained in ½ or more of the area of the portion from which the cured product was peeled off is represented by "B" (which means good). A case where the area of a portion on which the cured remained was less than ½ of the area of the portion from which the cured product was peeled off, or the cured product did not remain at all is represented by "C" (which means bad).

(Skin Formation Time)

After the painting of each of the compositions, a spatula was brought into contact with the surface at intervals as time elapsed. The time until the composition came not to adhere onto the spatula was measured (at 23° C. and 50% R.H.).

(Hardness)

The hardness of each of the cured products was measured (at 23° C. and 50% R.H.) in accordance with ASTM C 661.

(Viscosity)

An HB type viscometer was used to measure the viscosity of each of the compositions (rotor: No. 7, rotation number: 2, and 10 rpm, temperature: 23° C.).

(Tensile Properties)

Each of the curd products was made into sheet-form test pieces 3 mm in thickness. The test pieces were aged at 23° C. for 3 days and at 50° C. for 4 days, respectively, so as to be cured. Thereafter, the test pieces were each punched out into a dumbbell test piece in accordance with ASTM D 412. An autograph manufactured by Shimadzu Corp. was used to make tensile tests at a tensile speed of 500 mm/minute (and at 23° C. and 50% R.H.). The strength at break and the elongation at break were measured.

The various blended components used in the evaluations are as follows:

Component (A):

227: Kaneka MS Polymer (polyoxypropylene polymer having methyldimethoxysilyl group(s)), manufactured by Kaneka Corp.
Polymer 1: Polymer described in Synthesis Example 1
Polymer 2: Polymer described in Synthesis Example 2

Component (B):

14-WLP: Chlorinated polyolefin (chlorination ratio=27%, resin content=100%), manufactured by Toyo Kasei Kogyo Co., Ltd.

DX-523P: Chlorinated polyolefin (chlorination ratio=23%, resin content=100%), manufactured by Toyo Kasei Kogyo Co., Ltd.

TY AC-CPO: Maleic acid/acryl modified chlorinated polyolefin (chlorination ratio ≦5%, resin content=40%), manufactured by Toyo Kasei Kogyo Co., Ltd.

NS-2003: Non-chlorinated polyolefin (chlorination ratio=0%, resin content=20%), manufactured by Toyo Kasei Kogyo Co., Ltd.

P-628: Maleic acid/acryl modified chlorinated polyolefin (chlorination ratio ≦5%, resin content=40%), manufactured by Toyo Kasei Kogyo Co., Ltd.

KRATON G1702: Styrene-ethylene/propylene block polymer (styrene=28%), manufactured by Kraton Component (C):

KR-1840: hydroxyl group-containing hydrogenated petroleum resin, manufactured by Arakawa Chemical Industries Ltd.

Component (D):

HB-40: Partially-hydrogenated terphenyl, manufactured by Solutia Inc.

Mesamoll: Phenyl alkylsulfonate, manufactured by Bayer

Other Additives:

Hi-Pflex: Colloidal calcium carbonate, manufactured by Specialty Minerals

HUBERCARB Q2T: Surface-treated calcium carbonate, manufactured by Huber

Ultra Talc 609: Talc, manufactured by Specialty Minerals

Ti-Pure R902: Titanium dioxide, manufactured by Du Pont

Disparlon # 6500: Amide wax (thixotropic agent), manufactured by Kusumoto Chemicals Ltd.

Tinuvin 327: Benzotriazole based ultraviolet absorbent, manufactured by Ciba Specialty Chemicals Ltd.

Tinuvin 770: Hindered amine light stabilizer, manufactured by Ciba Specialty Chemicals Ltd.

A-171: Vinyltrimethoxysilane (dehydrating agent), manufactured by OSI Specialty

A-1100: γ-Aminopropyltriethoxysilane (adhesion-imparting agent), manufactured by OSI Specialty SUL-11A: Organic tin compound (curing catalyst), manufactured by OSI Specialty Each of the substrates used in the evaluations is as follows:
TPO substrate, manufactured by GAF
TPO substrate, manufactured by Carlisle
TPO substrate, manufactured by Alpha-system
The results are shown in Tables 1 to 3.

TABLE 1

| | | Example 1 | Example 2 | Example 3 | Example 4 | Comparative Example 1 | Comparative Example 2 |
|---|---|---|---|---|---|---|---|
| Component (A) | S227 | 70 | 70 | 70 | 70 | 70 | 70 |
| | Polymer 1 | | | | | | |
| | Polymer 2 | | | | | | |
| Component (B) | 14WLP | 15 | 10 | 10 | 5 | | 10 |
| | P-628 | | | 13 | | | |
| | TY AC-CPO | | | | | | |
| | DX-523P | | | | | | |
| | NS-2003 | | | | | | |
| | G1702 (25%) + HB-40 (75%) | | | | 20 | 40 | |
| Component (C) | KR-1840 | 20 | 20 | 20 | 20 | | |
| Component (D) | Mesamoll | 10 | 10 | 10 | 10 | 10 | 10 |
| | HB-40 | 20 | 20 | 20 | 20 | 20 | 20 |
| Calcium carbonate | Hi-Pflex | 80 | 80 | 80 | 80 | 80 | 80 |
| | Q2T | 50 | 50 | 50 | 50 | 50 | 50 |
| Talc | Ultra Talc 609 | | | | | | |
| Titanium oxide | Ti-Pure R902 | 10 | 10 | 10 | 10 | 10 | 10 |
| Thixotropic agent | Disparlon #6500 | 2 | 2 | 2 | 2 | 5 | 5 |
| Ultraviolet absorbent | Tinuvin 327 | 1 | 1 | 1 | 1 | 1 | 1 |
| Light stabilizer | Tinuvin 770 | 1 | 1 | 1 | 1 | 1 | 1 |
| Dehydrating agent | A-171 | 2 | 2 | 2 | 2 | 2 | 2 |
| Adhesion-imparting agent | A1100 | 3 | 3 | 3 | 3 | 3 | 3 |
| Curing catalyst | SUL-11 A | 2 | 2 | 2 | 2 | 2 | 2 |
| Adhesiveness (TPO substrate) | manufactured by GAF | A | A | A | B | C | C |
| | manufactured by Carlisle | A | A | A | B | C | C |
| | manufactured by Alpha-system | A | A | A | A | C | C |
| Skin formation time | (minutes) | 73 | 90 | 70 | 60 | 34 | 35 |
| Hardness | Shore A | 18 | 17 | 13 | 15 | 16 | 25 |
| Viscosity | 2 rpm (Pa · s) | 1200 | 1520 | 580 | 600 | 900 | 600 |
| | 10 rpm (Pa · s) | 510 | 640 | 280 | 300 | 290 | 200 |
| | Viscosity ratio (2/10) | 2.35 | 2.38 | 2.07 | 2.00 | 3.10 | 3.00 |
| Tensile properties | Strength (MPa) at 100% elongation | 0.21 | 0.11 | 0.112 | 0.054 | 0.20 | 0.36 |
| | Strength (MPa) at break | 0.63 | 0.64 | 0.611 | 0.409 | 0.53 | 0.88 |
| | Elongation (%) at break | 801 | 830 | 747 | 700 | 713 | 520 |

TABLE 2

|  |  | Example 5 | Example 6 | Example 7 | Example 8 | Example 9 |
|---|---|---|---|---|---|---|
| Component (A) | S227 | 70 | 70 | 70 | 70 | 70 |
|  | Polymer 1 |  |  |  |  |  |
|  | Polymer 2 |  |  |  |  |  |
| Component (B) | 14WLP | 15 | 10 | 10 | 7 | 12 |
|  | P-628 |  | 13 |  |  |  |
|  | TY AC-CPO |  |  | 13 |  |  |
|  | DX-523P |  |  |  | 8 |  |
|  | NS-2003 |  |  |  |  | 15 |
|  | G1702 (25%) + HB-40 (75%) |  |  |  |  |  |
| Component (C) | K-1840 | 20 | 20 | 20 | 20 | 20 |
| Component (D) | Mesamoll | 10 | 10 | 10 | 10 | 10 |
|  | HB-40 | 20 | 20 | 20 | 20 | 20 |
| Calcium carbonate | Hi-Pflex | 80 | 80 | 80 | 80 | 80 |
|  | Q2T | 30 | 30 | 30 | 30 | 30 |
| Talc | Ultra Talc 609 | 20 | 20 | 20 | 20 | 20 |
| Titanium oxide | Ti-Pure R902 | 10 | 10 | 10 | 10 | 10 |
| Thixotropic agent | Disparlon #6500 | 2 | 2 | 2 | 2 | 2 |
| Ultraviolet absorbent | Tinuvin 327 | 1 | 1 | 1 | 1 | 1 |
| Light stabilizer | Tinuvin 770 | 1 | 1 | 1 | 1 | 1 |
| Dehydrating agent | A-171 | 2 | 2 | 2 | 2 | 2 |
| Adhesion-imparting agent | A1100 | 3 | 3 | 3 | 3 | 3 |
| Curing catalyst | SUL-11 A | 2 | 2 | 2 | 2 | 2 |
| Adhesiveness (TPO substrate) | manufactured by GAF | A | A | A | A | B |
|  | manufactured by Carlisle | A | A | A | A | A |
|  | manufactured by Alpha-system | A | A | A | A | A |
| Skin formation time | (minutes) | 80 | 130 | 90 | 105 | 73 |
| Hardness | Shore A | 21 | 20 | 21 | 20 | 21 |
| Viscosity | 2 rpm (Pa · s) | 1100 | 2800 | 2600 | 2100 | 2400 |
|  | 10 rpm (Pa · s) | 500 | 1230 | 1100 | 900 | 920 |
|  | Viscosity ratio (2/10) | 2.20 | 2.28 | 2.36 | 2.33 | 2.61 |
| Tensile properties | Strength (MPa) at 100% elongation | 0.20 | 0.20 | 0.20 | 0.21 | 0.21 |
|  | Strength (MPa) at break | 0.76 | 0.62 | 0.65 | 0.71 | 0.62 |
|  | Elongation (%) at break | 540 | 584 | 667 | 567 | 579 |

TABLE 3

|  |  | Example 10 | Example 11 | Comparative Example 3 | Comparative Example 4 |
|---|---|---|---|---|---|
| Component (A) | S227 |  |  |  |  |
|  | Polymer 1 | 70 |  | 70 |  |
|  | Polymer 2 |  | 70 |  | 70 |
| Component (B) | 14WLP | 15 | 15 |  |  |
|  | P-628 |  |  |  |  |
|  | TY AC-CPO |  |  |  |  |
|  | DX-523P |  |  |  |  |
|  | NS-2003 |  |  |  |  |
|  | G1702 (25%) + HB-40 (75%) |  |  |  |  |
| Component (C) | KR-1840 | 20 | 20 |  |  |
| Component (D) | Mesamoll | 10 | 10 | 10 | 10 |
|  | HB-40 | 20 | 20 | 20 | 20 |
| Calcium carbonate | Hi-Pflex | 80 | 80 | 80 | 80 |
|  | Q2T | 50 | 50 | 50 | 50 |
| Talc | Ultra Talc 609 |  |  |  |  |
| Titanium oxide | Ti-Pure R902 | 10 | 10 | 10 | 10 |
| Thixotropic agent | Disparlon #6500 | 2 | 2 | 2 | 2 |
| Ultraviolet absorbent | Tinuvin 327 | 1 | 1 | 1 | 1 |
| Light stabilizer | Tinuvin 770 | 1 | 1 | 1 | 1 |
| Dehydrating agent | A-171 | 2 | 2 | 2 | 2 |
| Adhesion-imparting agent | A1100 | 3 | 3 | 3 | 3 |
| Curing catalyst | SUL-11 A | 2 | 2 | 2 | 2 |
| Adhesiveness (TPO substrate) | manufactured by GAF | A | A | C | C |
|  | manufactured by Carlisle | A | A | C | C |
|  | manufactured by Alpha-system | A | A | C | C |

As is evident from Tables 1 to 3, it is understood that Examples 1 to 11 each have a better adhesiveness to adhesion-resistant substrates (TPO substrates) than Comparative Examples 1 to 4.

What is claimed is:

1. A curable composition, comprising
   (A) a polyoxyalkylene polymer having reactive silicon group(s) represented by the following general formula (1):

$$-\text{Si}(R^1{}_{3-a})X_a \quad (1)$$

wherein $R^1$ represents an alkyl group having 1 to 20 carbon atoms, an aryl group having 6 to 20 carbon atoms, an aralkyl group having 7 to 20 carbon atoms, or a triorganosiloxy group represented by $R_3SiO-$ [wherein three Rs may be the same or different and are each a monovalent hydrocarbon group having 1 to 20 carbon atoms] provided that when two $R^1$s are present, they may be the same or different, X represents a hydroxyl group or a hydrolyzable group provided that when two or more Xs are present, they may be the same or different, and "a" represents 1, 2 or 3;
   (B) a polyolefin polymer selected from the group consisting of a chlorinated polyolefin and a polymer modified with acryl, maleic acid, and/or maleic anhydride; and
   (C) a tackifying resin.

2. The curable composition of claim 1, wherein said component (A) has a main chain skeleton of polyoxypropylene.

3. The curable composition of claim 1, wherein said component (A) has, in the molecule thereof, a group represented by the following general formula (2):

$$-NR^2-C(=O)- \quad (2)$$

(wherein $R^2$ represents a hydrogen atom, an alkyl group having 1 to 20 carbon atoms, an aryl group having 6 to 20 carbon atoms, or an aralkyl group having 7 to 20 carbon atoms).

4. The curable composition of claim 1, wherein said component (B) has a main chain skeleton a part or the whole of which is polypropylene.

5. The curable composition of claim 1, wherein said component (C) is a hydroxyl group-containing hydrogenated petroleum resin.

6. The curable composition of claim 1, further comprising a plasticizer (D).

7. An adhesive for waterproof sheets, wherein the curable composition of claim 1 is used.

8. An industrial adhesive, wherein the curable composition of claim 1 is used.

9. The curable composition according to claim 1, wherein said component (B) is a chlorinated polyolefin polymer.

10. The curable composition according to claim 2, wherein said component (B) is a chlorinated polyolefin polymer.

11. The curable composition according to claim 3, wherein said component (B) is a chlorinated polyolefin polymer.

12. The curable composition according to claim 4, wherein said component (B) is a chlorinated polyolefin polymer.

13. The curable composition according to claim 5, wherein said component (B) is a chlorinated polyolefin polymer.

14. The curable composition according to claim 6, wherein said component (B) is a chlorinated polyolefin polymer.

* * * * *